(12) United States Patent
Horachi et al.

(10) Patent No.: US 7,065,297 B2
(45) Date of Patent: Jun. 20, 2006

(54) OPTICAL TRANSMISSION SYSTEM

(75) Inventors: Kazunori Horachi, Kawasaki (JP);
Taro Asao, Kawasaki (JP); Kazuo Tanaka, Kawasaki (JP); Nobuyuki Nemoto, Kawasaki (JP); Hiroyuki Matsumoto, Kawasaki (JP); Miwa Taniguchi, Kawasaki (JP); Toshihiro Suzuki, Kawasaki (JP); Manabu Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 693 days.

(21) Appl. No.: 10/365,427

(22) Filed: Feb. 13, 2003

(65) Prior Publication Data
US 2004/0005152 A1 Jan. 8, 2004

(30) Foreign Application Priority Data
Jul. 3, 2002 (JP) ............................. 2002-194141

(51) Int. Cl.
*H04J 14/00* (2006.01)
*H04B 10/20* (2006.01)
*H04B 10/12* (2006.01)
*H04B 10/00* (2006.01)

(52) U.S. Cl. ..................... 398/70; 398/59; 398/159; 359/341.4

(58) Field of Classification Search .................... 398/3, 398/4, 15, 37, 58, 59, 158–161; 359/341.1
See application file for complete search history.

(56) References Cited

U.S. PATENT DOCUMENTS 6,369,938 B1 * 4/2002 Sugaya et al. ......... 359/341.42

OTHER PUBLICATIONS

U.S. Appl. No. 10/078,488, filed Feb. 21, 2002, Nobuyuki Nemoto et al.
U.S. Appl. No. 10/083,162, filed Feb. 27, 2002, Taro Asao, et al.

* cited by examiner

*Primary Examiner*—Kenneth Vanderpuye
*Assistant Examiner*—David Lee
(74) *Attorney, Agent, or Firm*—Staas & Halsey LLP

(57) ABSTRACT

In each node of an optical transmission system: an optical preamplifier has an ALC function for maintaining an optical output level constant and an AGC function for maintaining the gain constant; the operational mode of the optical preamplifier is changed from an ALC mode to an AGC mode after the gain is set in the ALC mode; an optical postamplifier has an AGC function; an optical switch unit performs an optical crossconnect operation; and a thru-light-shutoff control unit makes a switch setting so as to shut off pass-through light in the optical switch unit and stop transmission of an optical signal having an unstable level to a next stage when the optical preamplifier operates in the ALC mode, and clears the switch setting when the operational mode of the optical preamplifier is changed to the AGC mode.

13 Claims, 11 Drawing Sheets

OPTICAL TRANSMISSION SYSTEM

BACKGROUND OF THE INVENTION

1) Field of the Invention

The present invention relates to an optical transmission system. In particular, the present invention relates to an optical transmission system which performs WDM (wavelength division multiplex) transmission.

2) Description of the Related Art

The optical network technology is a core to develop a base of multimedia communication. It is desired that the service becomes available in a wider area and further sophisticated. In addition, since the transmission rates keep on increasing due to the recent explosive spread of the Internet and the like, the transmission capacities of the current systems in which optical signals of a single wavelength are transmitted in each optical fiber are insufficient. For example, it takes much time to transfer moving image data.

Therefore, WDM has been developed as a technique for efficiently utilizing existing optical fibers. The WDM is a technique in which signals in a plurality of channels are concurrently transmitted through a single optical fiber by multiplexing light having different wavelengths. A characteristic feature of the WDM optical amplification is the control in the ALC (automatic level control) and AGC (automatic gain control) modes.

In the ALC, the output level of each optical amplifier is maintained constant even when the input varies. Specifically, the gain of the optical amplifier is set so that the total output Pt (=Pn×n) of the optical amplifier is maintained constant regardless of the input level of the optical amplifier, where n is the number of the multiplexed wavelengths, Pn is a target output level at each wavelength, and the gain is a ratio of the optical output level to the optical input level.

In the AGC, the gain of the optical amplifier is maintained constant. Therefore, when the input level of the optical amplifier varies, the output level varies according to the variation of the input level. In the WDM transmission, smooth optical amplification control is realized by using the ALC and AGC in combination.

The optical amplifiers used in WDM nodes include optical preamplifiers and optical postamplifiers. The optical preamplifiers are multiwavelength optical reception amplifiers each of which receives and amplifies optical signals having multiple wavelengths and being transmitted from a node in the preceding stage, and the optical postamplifiers are multiwavelength optical transmission amplifiers each of which amplifies optical signals having multiple wavelengths and being internally processed for transmission to a node in the following stage.

Usually, the optical preamplifiers have both of the ALC and AGC functions, and the optical postamplifiers have only the AGC function. In addition, in the optical preamplifiers, the gain is initially set in an ALC mode at the time of initial setting, e.g., on a startup of a system or the amplifier, and thereafter the mode is changed to an AGC mode. Thus, the optical preamplifiers become operational. On the other hand, the optical postamplifiers are in an AGC mode in both of initial setting and operation, where the gain of each optical postamplifier is preset.

As described above, in the optical preamplifiers, the gain is initially set in the ALC mode according to an optical input level so as to maintain an optical output level constant, and thereafter the gain is maintained constant in the AGC mode. Therefore, when the optical input level of each optical preamplifier is not stable at the time of initial setting, the gain cannot be accurately set.

The ring network is widely used as a configuration of WDM networks. Hereinbelow, a problem which occurs in the case where an ALC mode is used in a WDM ring system is explained.

If an optical input level of an optical preamplifier in a node is not stable at the time of initial setting, the gain cannot be accurately set, and therefore amplification is performed from the unstable level. When optical signals are amplified in such a manner (i.e., optical signals are amplified, before the change to the AGC mode, in the stage of the ALC mode in which the gain is not accurately set) and transmitted to a next node, optical signals having unstable levels circulate through a plurality of nodes. Thus, the efficiency in system operation is decreased.

FIG. 11 is a diagram provided for explaining circulation of optical signals which have unstable levels. The nodes 301 to 304, which perform WDM transmission, are connected with optical fiber cables so as to form a ring structure. Each of the nodes 301 to 304 comprises an optical preamplifier 301a, . . . or 304a and an optical postamplifier 301b, . . . or 304b. In FIG. 11, other constituents such as optical switches are not shown.

At the time of initial setting, an optical signal added in the node 304 is amplified by the optical postamplifier 304b, and input into the optical preamplifier 301a in the node 301. When the optical preamplifier 301a operates in an ALC mode, the optical preamplifier 301a outputs an optical signal having an unstable level. When the optical signal output from the optical preamplifier 301a is input into the optical postamplifier 301b, the optical signal having an unstable level is transmitted from the node 301 to the node 302.

When an optical signal which has an unstable level is transmitted to a next stage before the gain is set in the optical preamplifier 301a, as explained above, it is impossible to accurately calculate the gain of the optical preamplifier 302a in the node 302, which receives the optical signal transmitted from the node 301.

When the above operations are repeated in the respective nodes, resultantly, optical signals having unstable levels circulate through the ring. Therefore, the optical input and output levels of the optical preamplifiers and the optical postamplifiers in the nodes become unstable, and oscillation occurs. Thus, the efficiency in operation decreases, and the service cannot be quickly started.

SUMMARY OF THE INVENTION

The present invention is made in view of the above problems, and the object of the present invention is to provide an optical transmission system which prevents transmission of optical signals having unstable levels through nodes, and improves startup performance in WDM initial setting and transmission quality.

In order to accomplish the above object, an optical transmission system for performing WDM optical transmission is provided. The optical transmission system comprises a plurality of nodes and an optical transmission medium making connections between the plurality of nodes. Each of the plurality of nodes includes: an optical preamplifier which has an ALC function for maintaining a level of the optical output constant and an AGC function for maintaining the gain constant, where the operational mode of the optical preamplifier is changed from an ALC mode to an AGC mode after the gain is set in the ALC mode; an optical postamplifier which has an AGC function; an optical switch unit which performs an optical crossconnect operation; and a thru-light-shutoff control unit which makes a switch setting so as to shut off thru (pass-through) light in the optical switch unit and stop transmission of an optical signal having an unstable level to a next stage when the optical preamplifier operates in the ALC mode, and clears the switch setting when the operational mode of the optical preamplifier is changed to the AGC mode.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

Figure 1:
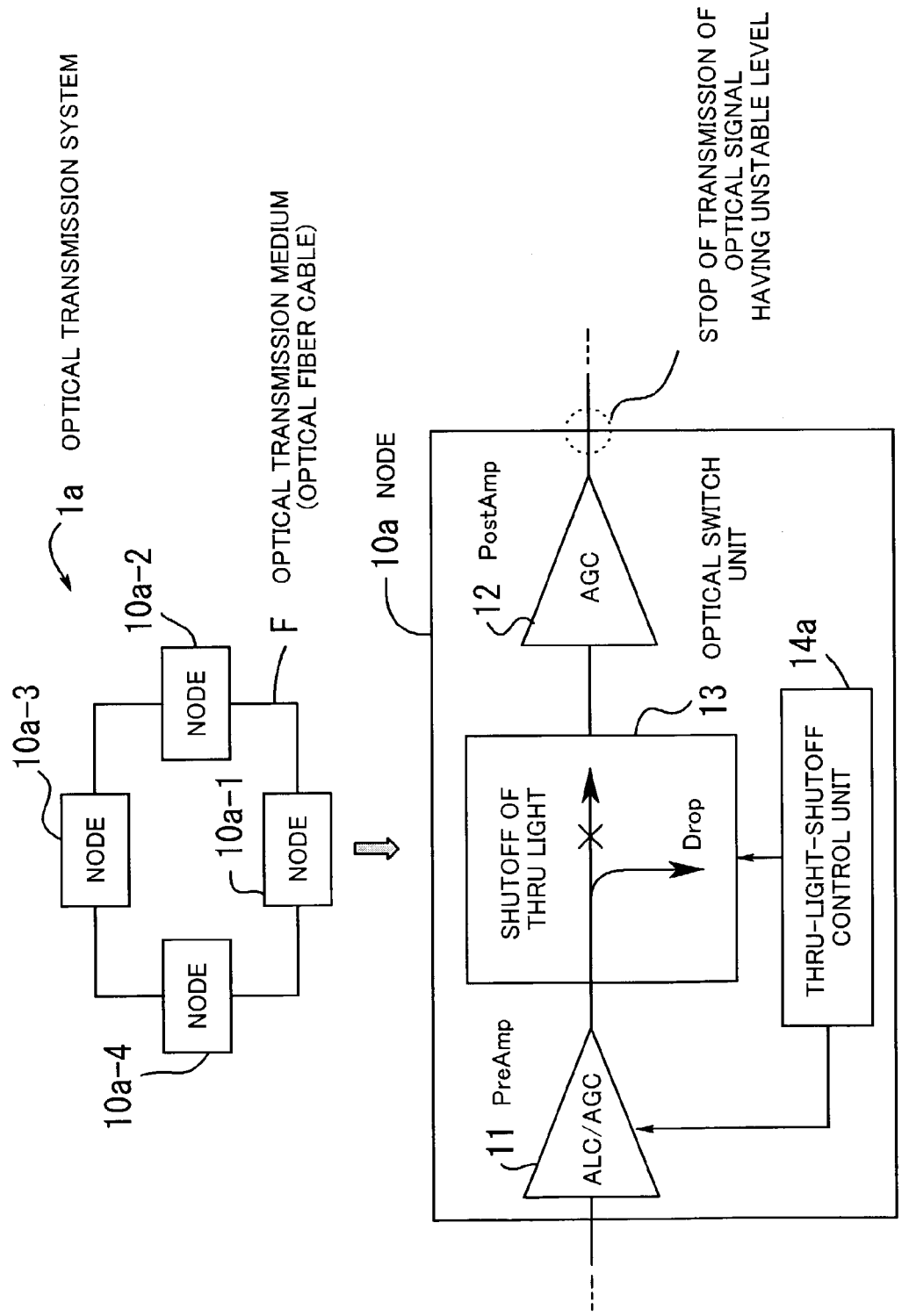
FIG. 1 is a diagram illustrating the principle of an optical transmission system according to the present invention.

Embodiments of the present invention are explained below with reference to drawings. FIG. 1 is a diagram illustrating the principle of an optical transmission system of the present invention. The optical transmission system 1a is a ring network in which nodes (optical transmission apparatuses) 10a-1 to 10a-4 (each of which is also denoted by 10a) are connected with a pair of opposing lines (optical fiber cables) F made of an optical transmission medium, where the nodes 10a-1 to 10a-4 perform WDM transmission, and the number of the nodes 10a-1 to 10a-4 is arbitrary.

Each node 10a comprises an optical preamplifier 11, an optical postamplifier 12, an optical switch unit 13, and a thru-light-shutoff control unit 14a. In FIG. 1, only a construction for transmission in one direction is illustrated. The optical preamplifier 11 is a multiwavelength optical amplifier which has an ALC function for maintaining an optical output level constant and an AGC function for maintaining a gain constant. The optical preamplifier 11 sets the gain in an ALC mode at the time of initial setting, and thereafter the operation mode of the optical preamplifier 11 is changed to an AGC mode, and becomes operational.

The optical postamplifier 12 is a multiwavelength optical postamplifier which has an AGC function, and is in an AGC mode in both of initial setting and operation. (In order to start up the optical preamplifier 11 and the optical postamplifier 12, some kind of input light is necessary.) The optical switch unit 13 realizes optical crossconnect control.

The thru-light-shutoff control unit 14a sets the optical switch unit 13 so as to shut off in the optical switch unit 13 thru light (pass-though light) which is transmitted from the optical preamplifier 11 and passes through the optical switch unit 13, when the optical preamplifier 11 operates in the ALC mode. Thus, it is possible to prevent transmission of an optical signal having an unstable level to the node in the following stage. In addition, the thru-light-shutoff control unit 14a clears the setting for shutting off the thru light, when the operation mode of the optical preamplifier 11 is changed to the AGC mode. That is, a wavelength setting in an operational state is realized.

Figure 2:
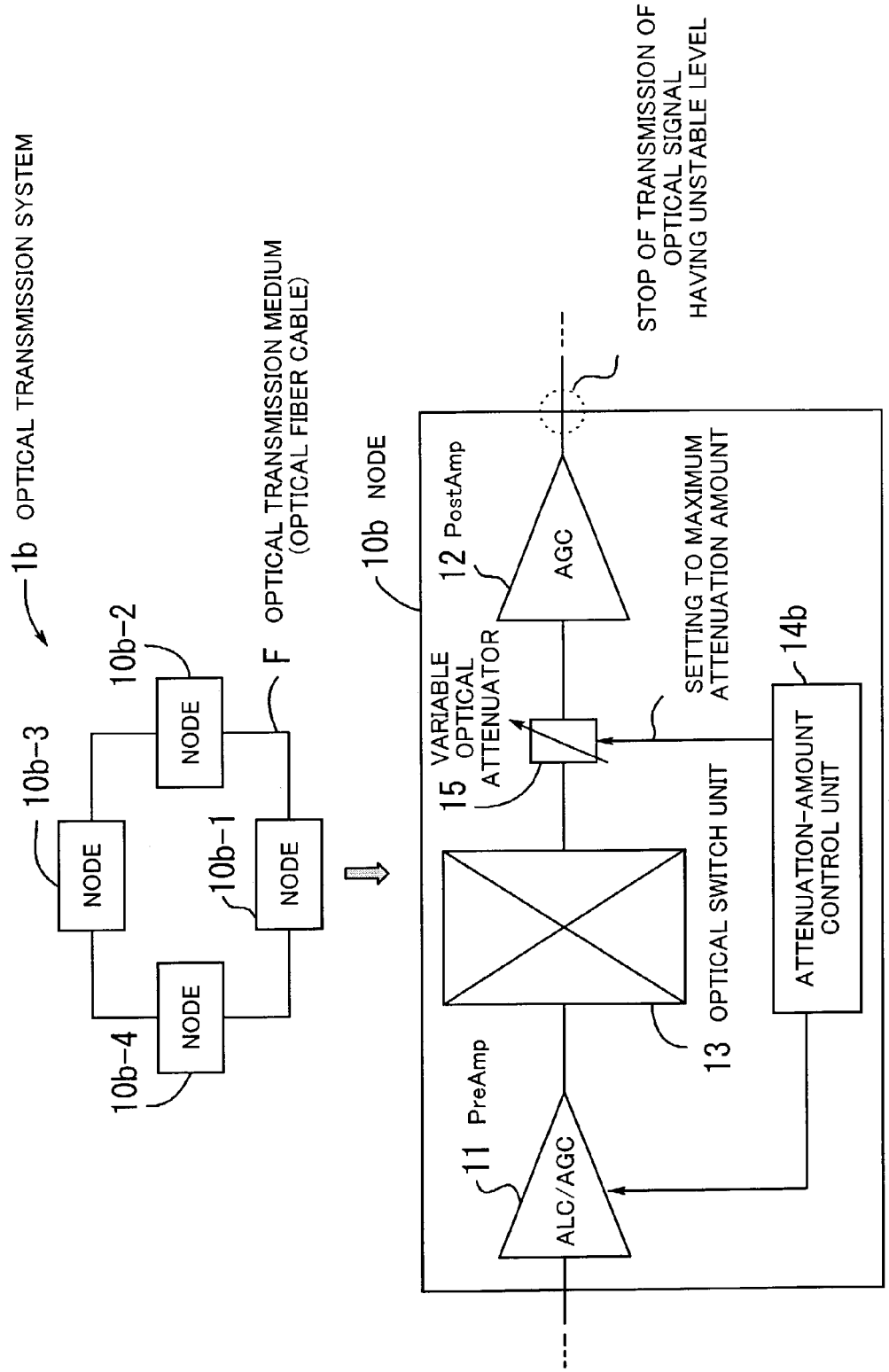
FIG. 2 is a diagram illustrating the principle of another optical transmission system according to the present invention.

FIG. 2 is a diagram illustrating the principle of another optical transmission system of the present invention. The optical transmission system 1b is a ring network in which nodes (optical transmission apparatuses) 10b-1 to 10b-4 (each of which is also denoted by 10b) are connected with a pair of opposing lines (optical fiber cables) F made of an optical transmission medium, where the nodes 10b-1 to 10b-4 perform WDM transmission, and the number of the nodes 10b-i to 10b-4 is arbitrary.

Each node 10b comprises an optical preamplifier 11, an optical postamplifier 12, an optical switch unit 13, an attenuation-amount control unit 14b, and a variable optical attenuator 15. In FIG. 2, only a construction for transmission in one direction is illustrated. The optical preamplifier 11, the optical postamplifier 12, and the optical switch unit 13 in the construction of FIG. 2 are identical to the corresponding elements in the construction of FIG. 1, and therefore the explanations of these elements are not repeated.

The variable optical attenuator 15 is provided in the stage following the optical switch unit 13 for each wavelength of optical signals, and adjusts the level of a received optical signal. The attenuation-amount control unit 14b sets the amount of attenuation in the variable optical attenuator 15 which receives a signal from the optical preamplifier 11, to maximum, when the optical preamplifier 11 operates in an ALC mode. Thus, it is possible to prevent transmission of an optical signal having an unstable level to the node in the following stage. In addition, the attenuation-amount control unit 14b clears the setting to the maximum amount of attenuation when the operation mode of the optical preamplifier 11 is changed to the AGC mode. That is, the amount of attenuation corresponding to an operational state is set.

In practice, the functions of both of the nodes 10a and 10b can be provided in each node, and transmission of an optical signal having an unstable level to the node in the following stage can be prevented by performing at least one of the operation of shutting off the thru light in the optical switch unit 13 and the operation of controlling the amount of attenuation in the variable optical attenuator 15.

Figure 3:
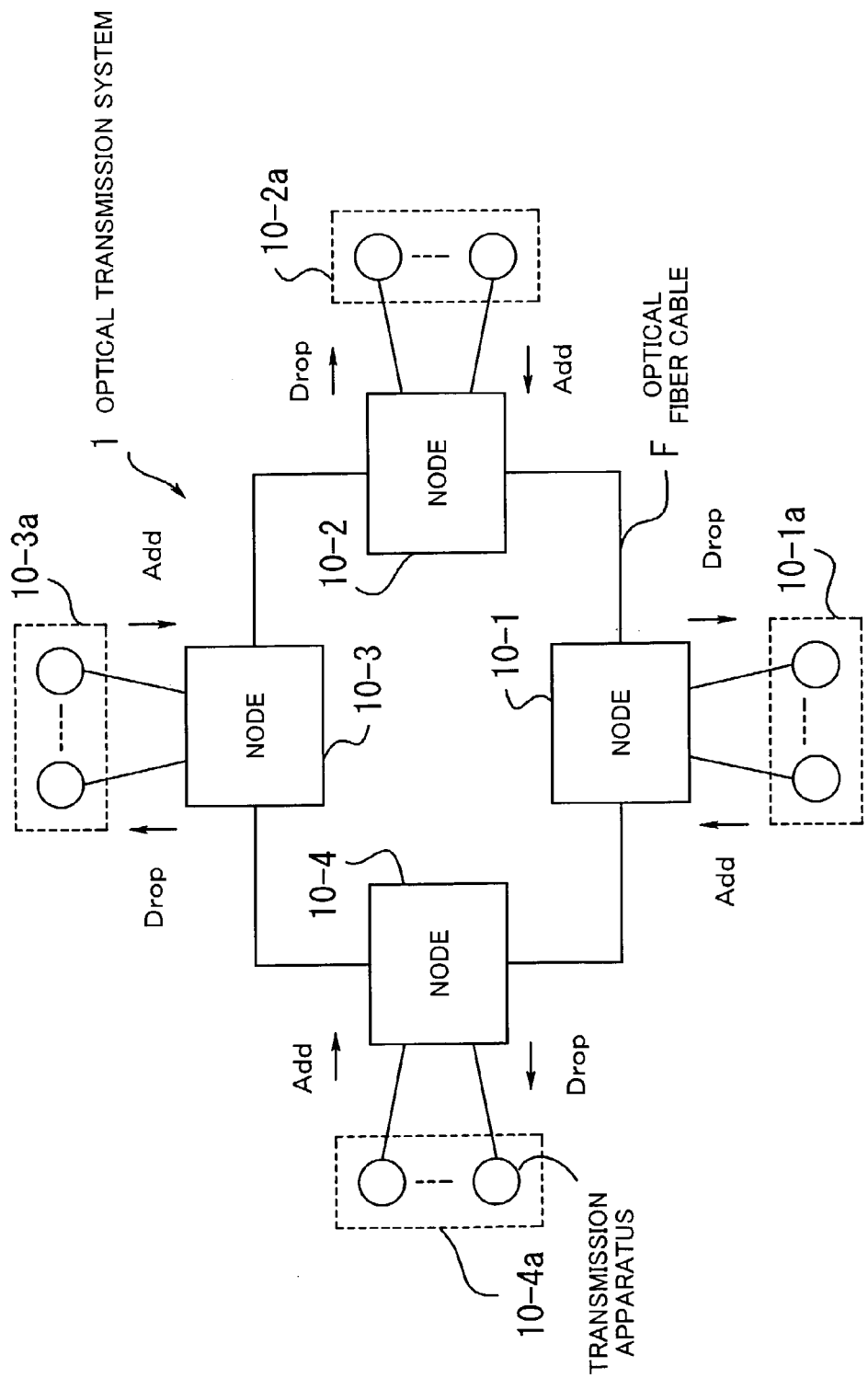
FIG. 3 is a diagram illustrating a construction of an optical transmission system according to the present invention.

Next, a construction and operations of an optical transmission system according to the present invention constituted by a plurality of nodes each of which is provided with the functions of both of the aforementioned nodes 10a and 10b are explained in detail below. FIG. 3 is a diagram illustrating the construction of such an optical transmission system according to the present invention. The optical transmission system 1 comprises nodes 10-1 to 10-4 (each of which is also denoted by 10) connected with optical fiber cables F made of an optical transmission medium. The nodes 10-1 to 10-4 constitute a ring network, and perform WDM transmission.

For example, a plurality of SONET/SDH transmission apparatuses 10-1a to 10-4a are connected to the nodes 10-1 to 10-4, respectively, so that OADM (optical add drop multiplex) control operations are performed.

That is, the nodes 10-1 to 10-4 optically multiplex signals added by the SONET/SDH transmission apparatuses 10-1a to 10-4a, respectively, so that the optically multiplexed signals are input into a single optical fiber cable F, and transmitted in the ring. In addition, signals transmitted in the ring are optically demultiplexed, and dropped to the SONET/SDH transmission apparatuses 10-1a to 10-4a.

Figure 4:
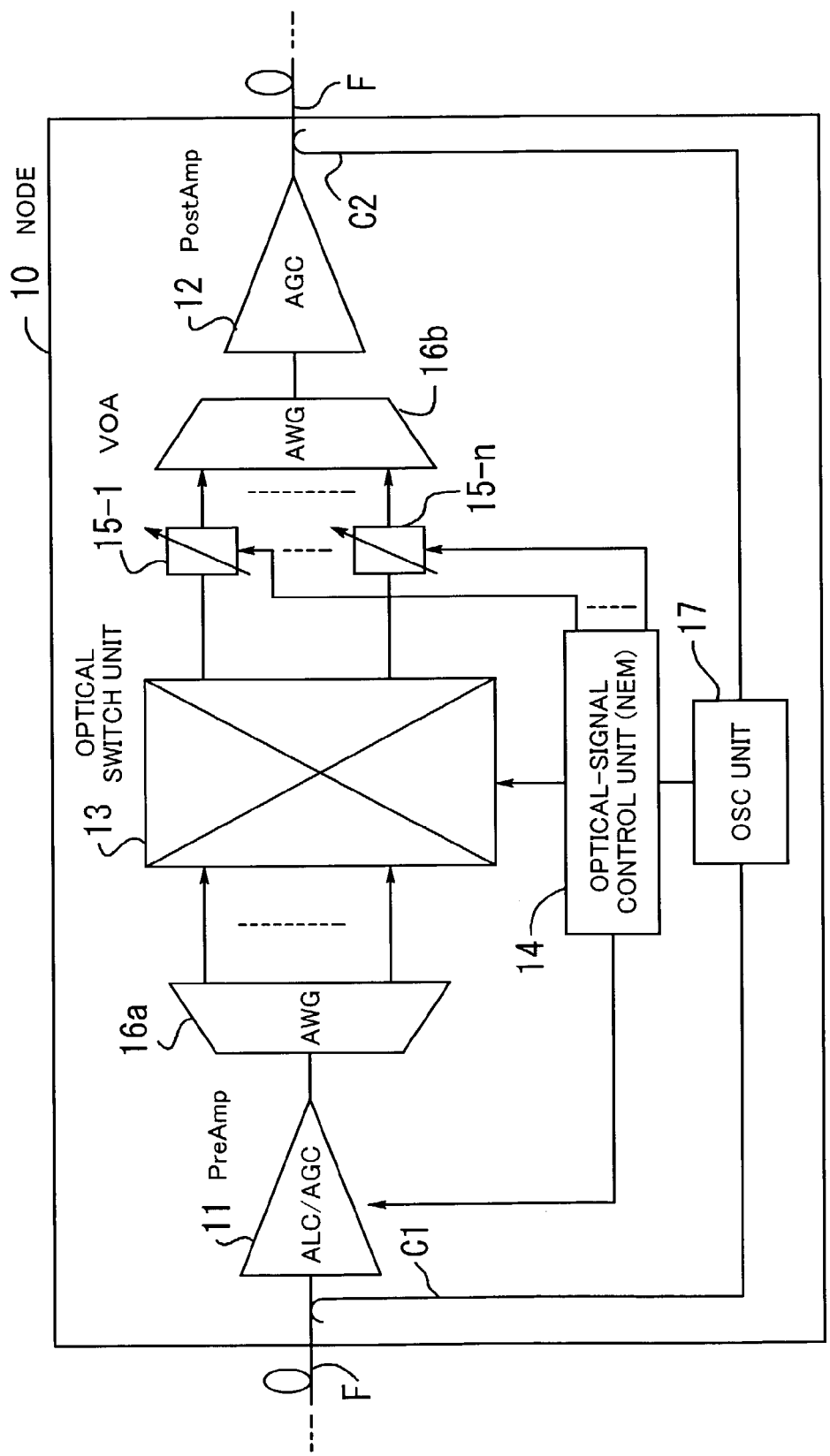
FIG. 4 is a diagram illustrating a construction of a node.

FIG. 4 is a diagram illustrating a construction of each node 10. Each node 10 comprises an optical preamplifier 11, an optical postamplifier 12, an optical switch unit 13, an optical-signal control unit 14, variable optical attenuators (VOAs) 15-1 to 15-n, array wave-guide gratings (AWGs) 16a and 16b, an optical-supervisory-channel (OSC) unit 17, and couplers C1 and C2. In FIG. 4, only a construction for transmission in one direction is illustrated.

The optical switch unit 13 is realized by, for example, micro-electro-mechanical-systems (MEMS) type switch. The MEMS-type switch is a switch in which micromirrors are integrated. The MEMS-type switch switches an optical path by reflecting injected light with the micromirrors. A digital signal processor (DSP) which performs computation for operating the micromirrors is provided in a switch module.

The optical-signal control unit 14 is a network-element management unit which controls the entire node 10. The optical-signal control unit 14 has the aforementioned functions of the thru-light-shutoff control unit 14a and the attenuation-amount control unit 14b, and prevents transmission of an optical signal having an unstable level to the node in the following stage by performing at least one of the operation of shutting off the thru light and the operation of controlling the amount of attenuation. Hereinafter, the optical-signal control unit 14 is referred to as the NEM 14.

The AWGs 16a and 16b are wavelength-multiplex-and-demultiplex elements which multiplex and demultiplex optical signals. In the node 10, the AWG 16a demultiplexes optical signals, and the AWG 16b multiplexes optical signals. The OSC unit 17 performs processing for transmission and reception. In the WDM communications, optical control signals having a frequency of about 1 to 150 MHz and being called OSC signals, as well as main optical signal, are transmitted.

Next, a sequence of processing of a wavelength-multiplexed optical signal is explained. The optical preamplifier 11 receives and amplifies an optical signal transmitted through the optical fiber cable F from a node in the preceding stage (on the upstream side). The AWG 16a optically demultiplexes the amplified optical signal into optical signals of a plurality of wavelengths. The optical switch unit 13 selects (thru, add, or drop) paths of the demultiplexed optical signals. Wavelength setting information (i.e., information indicating what path is selected for what wavelength) is provisioned in advance by the NEM 14 in the optical switch unit 13.

The VOAs 15-1 to 15-n adjust optical levels at the respective wavelengths. The AWG 16b optically multiplexes the optical signals after the optical levels of the optical signals are adjusted. The optical postamplifier 12 amplifies the optically multiplexed optical signals, and transmits the amplified optical signals through the optical fiber cable F to a node in the following stage (on the downstream side).

The OSC unit 17 receives through the coupler C1 OSC signals transmitted from the node in the preceding stage, performs optical-to-electric conversion of monitor information and the like included in the OSC signals, and sends the converted monitor information and the like to the NEM 14. In addition, the OSC unit 17 receives from the NEM 14 monitor information on the inside of the node 10, performs electric-to-optical conversion of the monitor information on the inside of the node 10, superimposes on OSC signals the converted monitor information on the inside of the node 10, and sends through the coupler C2 the superimposed OSC signals to the node in the following stage.

Figure 5:
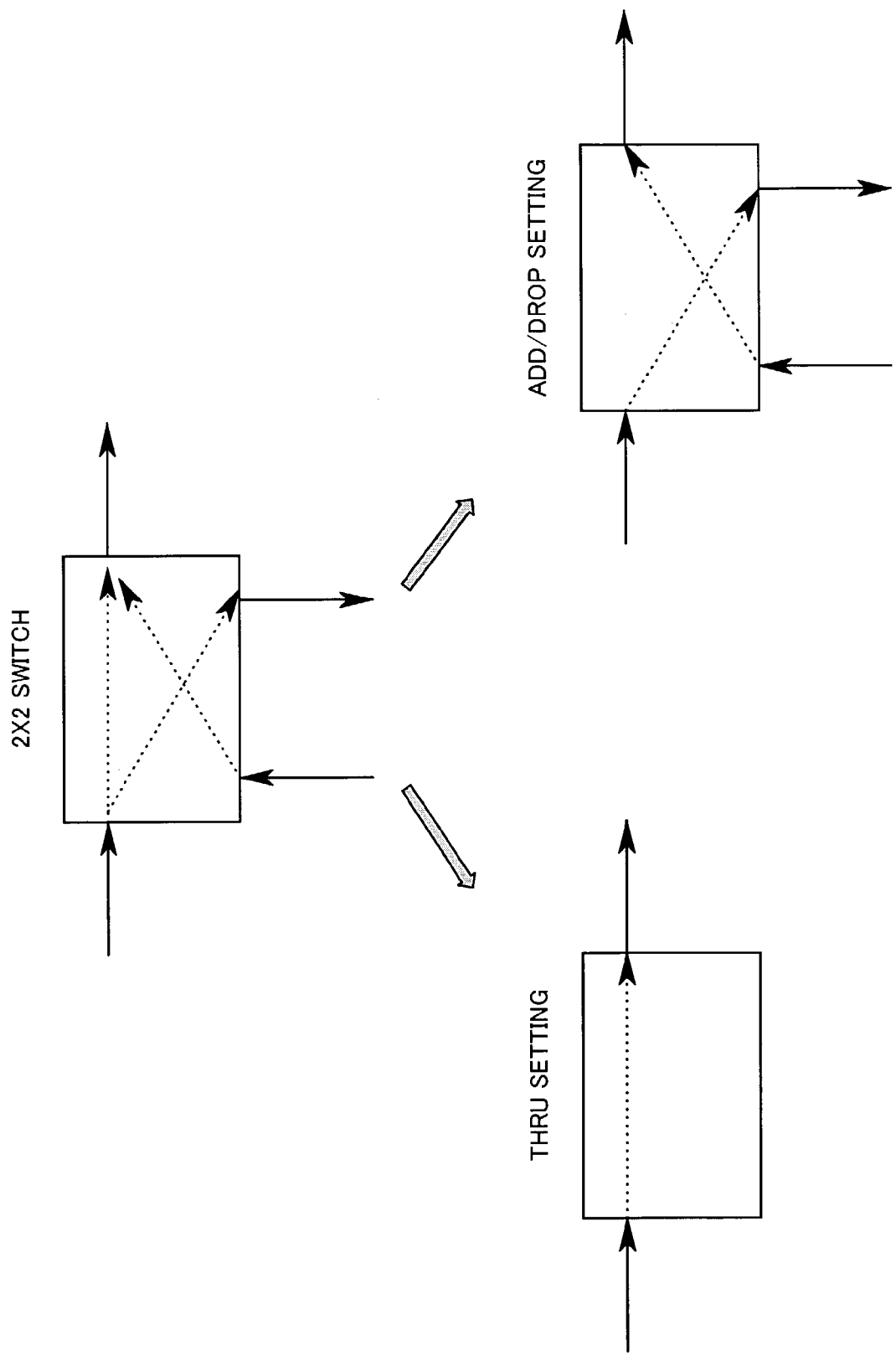
FIG. 5 is a diagram illustrating switch states of an optical switch unit.

FIG. 5 is a diagram illustrating switch states of the optical switch unit 13. The optical switch unit 13 is constituted by 2×2 switches each having two input ports and two output ports. Although each 2×2 switch can realize three paths of Thru, Add, and Drop, each 2×2 switch can be switched between two operational states, a Thru setting and an Add/Drop setting. That is, the optical switch unit 13 realizes the Thru path in the Thru setting, and both of the Add path and the Drop path in the Add/Drop setting.

Figure 6:
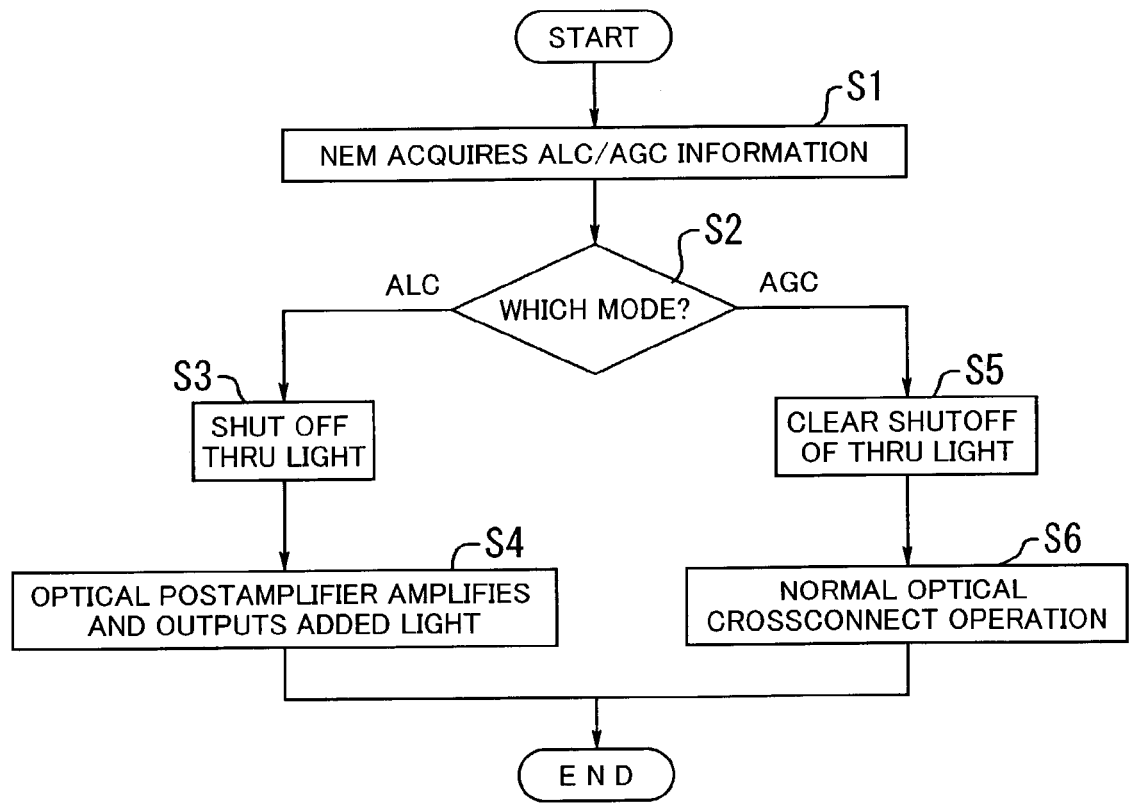
FIG. 6 is a flowchart indicating operations of thru-light-shutoff control.

Next, operations for the thru-light-shutoff control are explained. FIG. 6 is a flowchart indicating operations of the thru-light-shutoff control.

[S1] The NEM 14 acquires from the optical preamplifier 11 in the node to which the NEM 14 belongs ALC/AGC information on the optical preamplifier 11, where the ALC/AGC information indicates whether the optical preamplifier 11 currently operates in the ALC or AGC mode.

[S2] When the optical preamplifier 11 currently operates in the ALC mode, the operation goes to step S3. When the optical preamplifier 11 currently operates in the AGC mode, the operation goes to step S5.

[S3] The NEM 14 supplies to the optical switch unit 13 (specifically, to the DSP in the optical switch unit 13) an instruction for switch setting so as to shut off the thru light. That is, the optical switch unit 13 is set to the Add/Drop position so as to drop an optical signal from the optical preamplifier 11.

[S4] Added light is transmitted through the optical switch unit 13 to the optical postamplifier 12, which amplifies and outputs the added light.

[S5] The NEM 14 clears the setting for shutting off the thru light in the optical switch unit 13.

[S6] The optical switch unit 13 performs optical cross-connect operations based on the wavelength setting realized by the provisioning.

Figure 7:
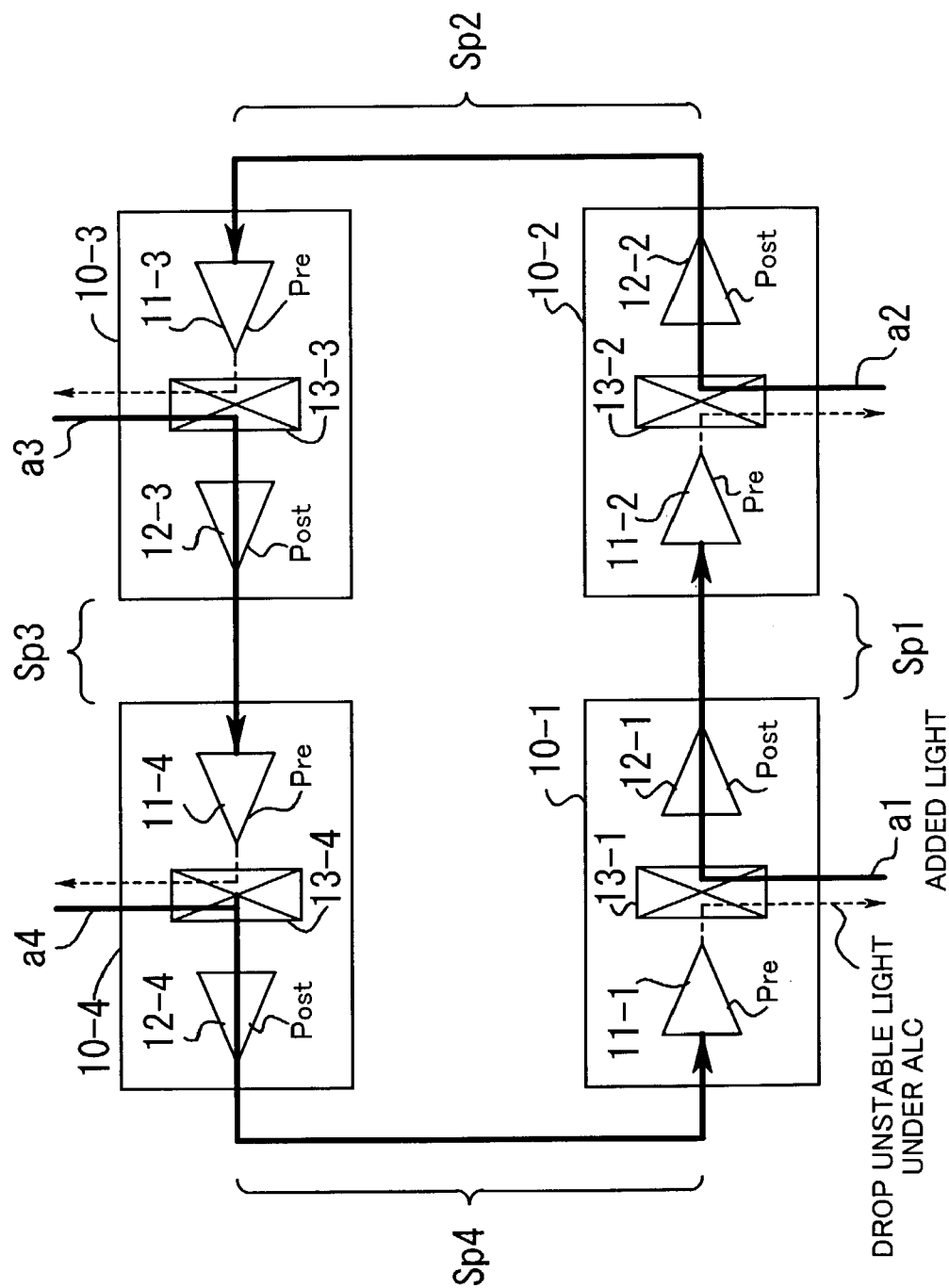
FIG. 7 is a diagram illustrating flows of light through a ring network under the thru-light-shutoff control.

FIG. 7 is a diagram illustrating flows of light through the ring network under the thru-light-shutoff control. In FIG. 7, only the constituents of the nodes 10-1 to 10-4 which are necessary for the explanations are indicated. In the node 10-1, when the optical preamplifier 11-1 operates in the ALC mode, the output light of the optical preamplifier 11-1 is dropped from the optical switch unit 13-1.

In addition, the added light a1 is transmitted through the optical switch unit 13-1 to the optical postamplifier 12-1, which is started up in response to the added light a1, amplifies the added light a1 with a gain which is set in advance, and transmits the amplified, added light a1 to the node 10-2.

Since the node 10-1 is controlled as above, an optical signal having an unstable level does not flow in a span Sp1. In addition, the gain of the optical preamplifier 11-2 in the node 10-2 in the ALC mode can be calculated based on the added light a1 having a stable level.

On the other hand, in the node 10-2, when the optical preamplifier 11-2 operates in the ALC mode, the output light of the optical preamplifier 11-2 is dropped from the optical switch unit 13-2. In addition, added light a2 is transmitted through the optical switch unit 13-2 to the optical postamplifier 12-2.

The optical postamplifier 12-2 is started up in response to the added light a2, amplifies the added light a2 with a gain which is set in advance, and transmits the amplified, added light a2 to the node 10-3. Since the node 10-2 is controlled as above, an optical signal having an unstable level does not flow in a span Sp2. In addition, the gain of the optical preamplifier 11-3 in the node 10-3 in the ALC mode can be calculated based on the added light a2 having a stable level.

Since the nodes 10-3 and 10-4 are similarly controlled, no optical signal having an unstable level flows in spans Sp3 and Sp4, and each node does not adversely affect the adjacent node. In addition, the gain of the optical preamplifier 11-4 in the node 10-4 in the ALC mode can be calculated based on the added light a3 having a stable level, and the gain of the optical preamplifier 11-1 in the node 10-1 in the ALC mode can also be calculated based on the added light a4 having a stable level.

Thereafter, when the operational modes of the optical preamplifiers 11-1 to 11-4 in the nodes 10-1 to 10-4 are each changed to an AGC mode, the optical switch units 13-1 to 13-4 perform crossconnect based on the wavelength settings realized by the provisioning. In this situation, all of the optical amplifiers in the nodes 10-1 to 10-4 are operational.

Thus, it is possible to completely prevent flows of optical signals having unstable levels in the spans at the time of initial setting of the ring network before all of the optical amplifiers become operational. Incidentally, the operations for the thru-light-shutoff control explained above are performed independently in each node.

As explained above, when the optical preamplifier 11 in each node operates in the ALC mode, the optical signal having an unstable level and being output from the optical preamplifier 11 is shut off in the optical switch unit 13, and transmission of the optical signal having the unstable level to the node in the following stage is stopped. In addition, since, in this case, the light added in each node is sent to the optical postamplifier 12, the optical postamplifier 12 is started up in response to the added light.

Thereafter, when the operational mode of the optical preamplifier 11 is changed to the AGC mode, the startup of the optical preamplifier 11 is completed, and therefore the NEM 14 clears the thru-light-shutoff control of the optical switch unit 13. Thus, the optical signal having the unstable level is not transmitted to the node in the following stage, and the startup operation at the time of initial setting can be efficiency performed.

In the construction explained above, the NEM 14 determines the operational situation of the optical preamplifier 11, and supplies to the optical switch unit 13 an instruction for switch setting which realizes the thru-light-shutoff control. Alternatively, it is possible that the DSP contained in the module of the optical switch unit 13 determines the operational situation of the optical preamplifier 11, and performs the switching operation. Further, the optical switch unit 13 may be realized by a planar-waveguide switch, instead of the MEMS.

Figure 8:
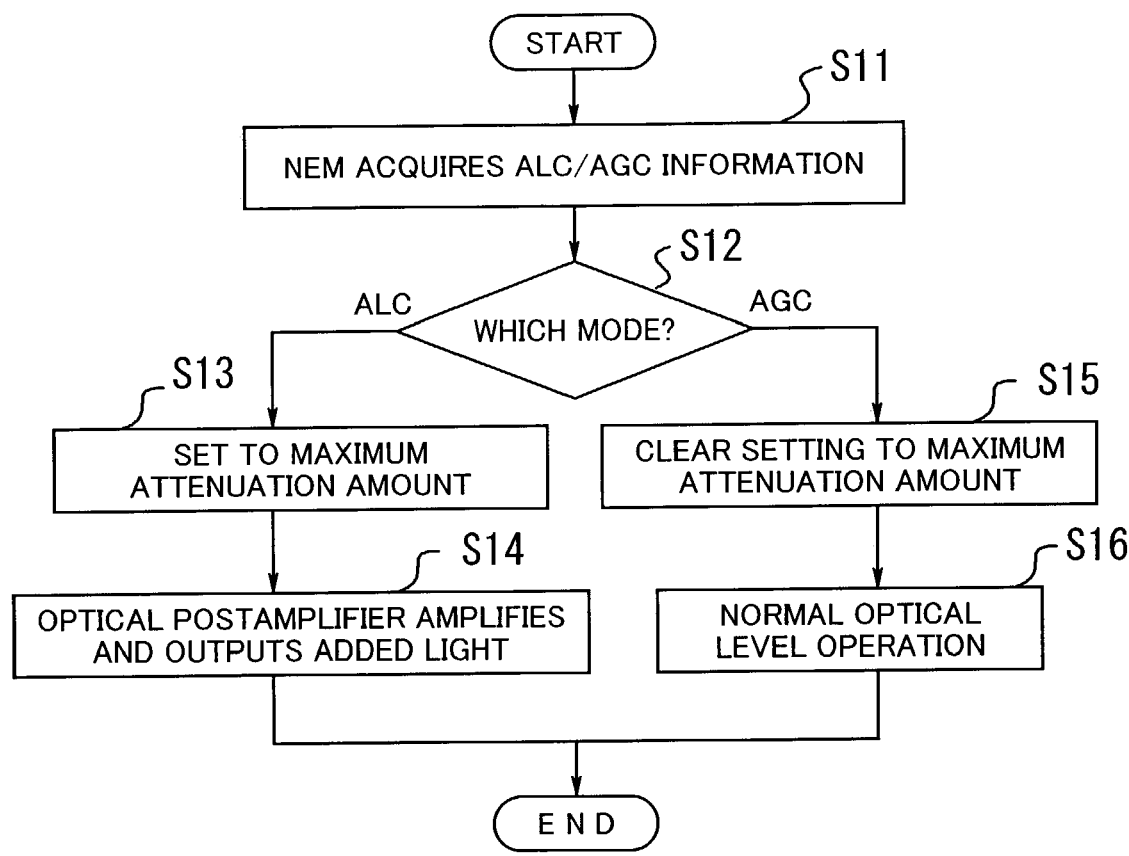
FIG. 8 is a flowchart indicating operations of control of amounts of attenuation.

Next, operations for controlling the amount of attenuation are explained. FIG. 8 is a flowchart indicating the operations for controlling the amount of attenuation.

[S11] The NEM 14 acquires from the optical preamplifier 11 in the node to which the NEM 14 belongs ALC/AGC information on the optical preamplifier 11.

[S12] When the optical preamplifier 11 currently operates in the ALC mode, the operation goes to step S13. When the optical preamplifier 11 currently operates in the AGC mode, the operation goes to step S15.

[S13] The NEM 14 sets the amount of attenuation in a VOA which receives thru light output from the optical switch unit 13, to maximum. Hereinafter, for the purpose of explanation, such a VOA is referred to the VOA 15t.

[S14] Added light is transmitted to the optical postamplifier 12 through the optical switch unit 13 and a VOA in which the maximum value of the amount of attenuation is not set. Hereinafter, for the purpose of explanation, such a VOA is referred to the VOA 15a. The optical postamplifier 12 amplifies and outputs the added light.

[S15] The NEM 14 clears the setting of the amount of attenuation to the maximum in the VOA 15t.

[S16] The VOA 15t adjusts the optical level based on a normal setting of the amount of attenuation.

Figure 9:
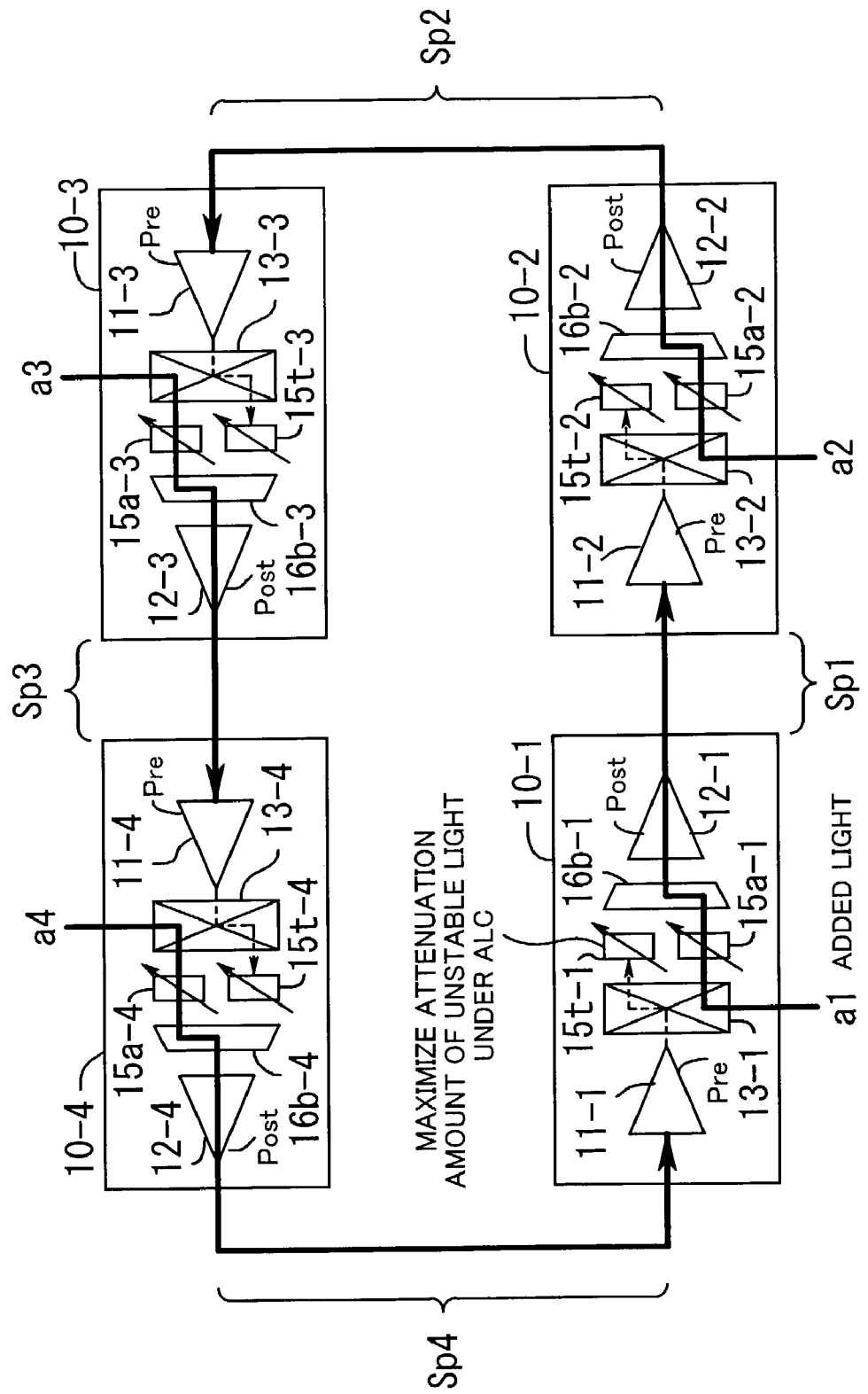
FIG. 9 is a diagram illustrating flows of light through a ring network under the control of the amounts of attenuation.

FIG. 9 is a diagram illustrating flows of light through a ring network under the control of the amounts of attenuation. In FIG. 9, only the constituents of the nodes 10-1 to 10-4 which are necessary for the explanations are indicated. When the optical preamplifier 11-1 in the node 10-1 operates in the ALC mode, the output light from the optical preamplifier 111 is received by the VOA 15t-1 through the optical switch unit 13-1, and maximumly attenuated (shut off) by the VOA 15t-1.

In addition, the added light a1 is transmitted through the optical switch unit 13-1 to the VOA 15a-1, which performs the normal optical level adjustment, and outputs the added light a1. Then, the added light a1 is transmitted through the AWG 16b-1 to the optical postamplifier 12-1, which is started up in response to the added light a1. The optical postamplifier 12-1 amplifies the added light a1 with a gain which is set in advance, and transmits the amplified, added light a1 to the node 10-2.

Since the node 10-1 is controlled as above, an optical signal having an unstable level does not flow in the span Sp1. In addition, the gain of the optical preamplifier 11-2 in the node 10-2 in the ALC mode can be calculated based on the added light a1 having a stable level.

On the other hand, in the node 10-2, when the optical preamplifier 11-2 operates in the ALC mode, the output light of the optical preamplifier 11-2 is received by the VOA 15t-2 through the optical switch unit 13-2, and maximumly attenuated (shut off) by the VOA 15t-2.

In addition, the added light a2 is transmitted through the optical switch unit 13-2 to the VOA 15t-2, which performs the normal optical level adjustment, and outputs the added light a2. Then, the added light a2 is transmitted through the AWG 16b-2 to the optical postamplifier 12-2.

The optical postamplifier 12-2 is started up in response to the added light a2, amplifies the added light a2 with a gain which is set in advance, and transmits the amplified, added light a2 to the node 10-3. Since the node 10-2 is controlled as above, an optical signal having an unstable level does not flow in the span Sp2. In addition, the gain of the optical preamplifier 11-3 in the node 10-3 in the ALC mode can be calculated based on the added light a2 having a stable level.

Since the nodes 10-3 and 10-4 are similarly controlled, no optical signal having an unstable level flows in the spans Sp3 and Sp4, and each node does not adversely affect the adjacent node. In addition, the gain of the optical preamplifier 11-4 in the node 10-4 in the ALC mode can be calculated based on the added light a3 having a stable level, and gain of the optical preamplifier 11-1 in the node 10-1 in the ALC mode can also be calculated based on the added light a4 having a stable level.

Thereafter, when the operational modes of the optical preamplifiers 11-1 to 11-4 in the nodes 10-1 to 10-4 are each changed to the an AGC mode, the VOAs 15t-1 to 15t-4 perform the normal optical level adjustment. Then, all of the optical amplifiers in the nodes 10-1 to 10-4 become operational.

Thus, it is possible to completely prevent flows of optical signals having unstable levels in the spans at the time of initial setting of the ring network before all of the optical amplifiers become operational. Incidentally, the operations for the control of the amounts of attenuation explained above are performed independently in each node.

As explained above, when the optical preamplifier 11 in each node operates in the ALC mode, the optical signal having an unstable level and being output from the optical preamplifier 11 is shut off in the VOA 15t by setting the amount of attenuation to maximum, so that transmission of the optical signal having an unstable level to the node in the following stage is stopped. In addition, when the operational mode of the optical preamplifier 11 is changed to the AGC mode, the NEM 14 clears the setting to the maximum amount of the attenuation in the VOA 15t. Thus, the optical signal having an unstable level is not transmitted to the node in the following stage, and the startup operation at the time of initial setting can be efficiency performed.

Figure 10:
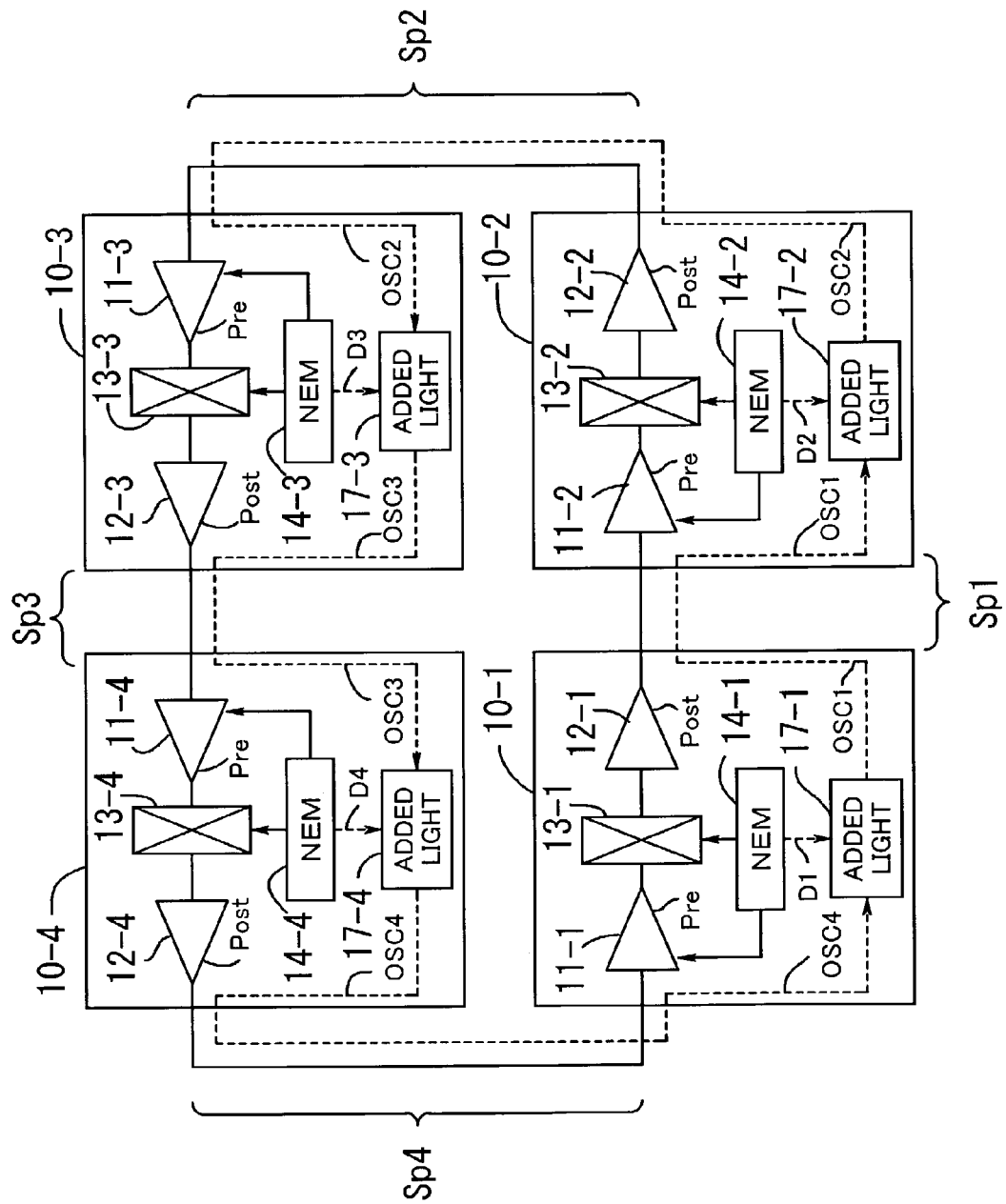
FIG. 10 is a diagram for explaining operations of the optical transmission system.
Figure 11:
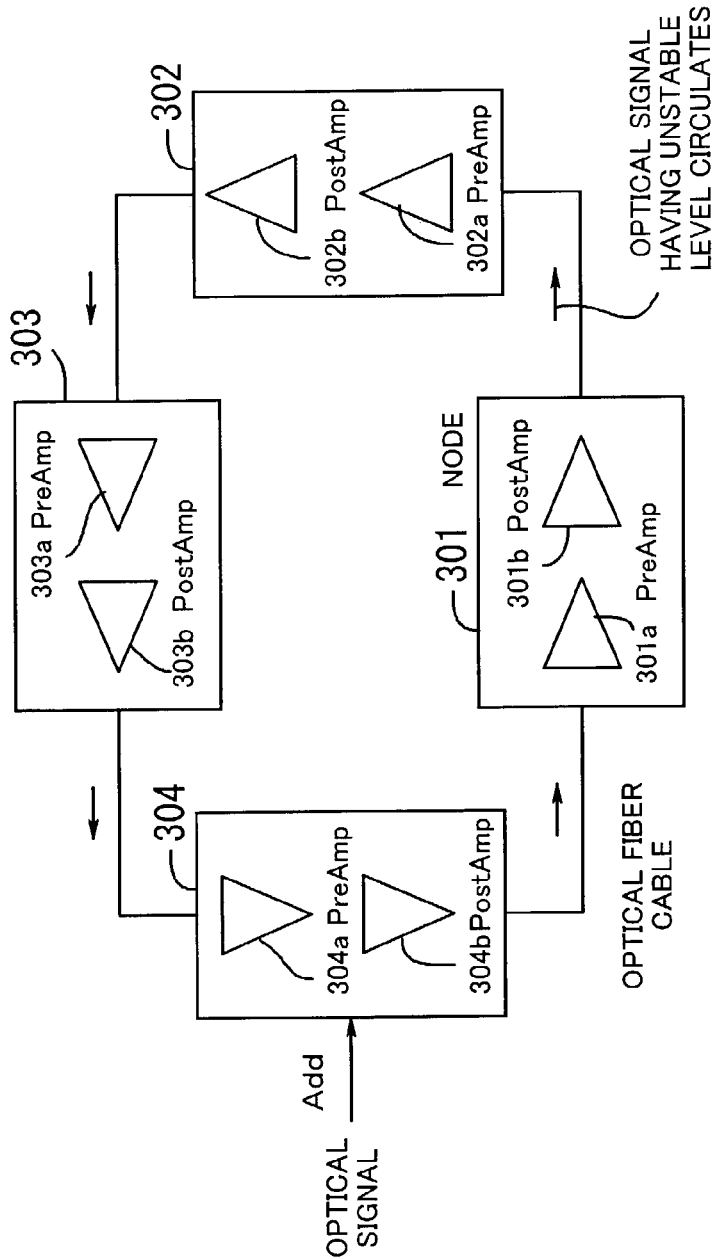
FIG. 11 is a diagram provided for explaining circulation of optical signals which have unstable levels.

Next, an optical transmission system according to the present invention in which a master node and slave nodes constitute a ring network is explained. FIG. 10 is a diagram for explaining operations of the optical transmission system. In FIG. 10, the dashed lines indicate OSC signals.

In the construction of FIG. 10, the node 10-1 is the master node, and the nodes 10-2 to 10-4 are the slave nodes. In FIG. 10, only the constituents of the nodes 10-1 to 10-4 which are necessary for the explanations are indicated.

The NEM 14-1 has a function as a master-side thru-light-shutoff control unit, and the OSC unit 17-1 has a function as a unit for transmitting dummy information on completion of a startup. In addition, the NEMs 14-2 to 14-4 have a function as a slave-side thru-light-shutoff control unit, and the OSC units 17-2 to 17-4 have a function as a unit for transmitting information on completion of a startup.

[Operation 1] The NEM 14-1 in the master node 10-1 instructs the optical switch unit 13-1 to shut off thru light, and sends to the OSC unit 17-1 dummy information D1 on completion of a startup. Then, the OSC unit 17-1 transmits to the slave node 10-2 the dummy information D1 on completion of a startup as an OSC signal OSC1.

The dummy information on completion of a startup is information which falsely indicates that startup of the optical preamplifier 11-1 is completed. That is, the dummy information on completion of a startup is false information falsely indicating that the operational mode of the optical preamplifier 11-1 has been changed to the AGC mode while actually the startup of the optical preamplifier 11-1 has not been completed and the optical preamplifier 11-1 does not operate in the AGC mode.

The above dummy information on completion of a startup is sent to the slave node 10-2 until information on completion of a startup transmitted from the slave node 10-4 (which is located in the preceding stage) is received. On the other hand, the information on completion of a startup is information indicating that each of the optical preamplifiers 11-2 to 11-4 in the slave nodes 10-2 to 10-4 has been started up (i.e., the operational mode of each of the optical preamplifiers 11-2 to 11-4 in the slave nodes 10-2 to 10-4 has been changed to the AGC mode).

[Operation 2] In the slave node 10-2, the operations for the thru-light-shutoff control as explained with reference to FIGS. 6 and 7 are performed. When the startup of the optical preamplifier 11-2 is completed, the NEM 14-2 sends to the OSC unit 17-2 information D2 on the completion of the startup.

In addition, when the OSC unit 17-2 receives the OSC signal OSC1 from the master node 10-1 and the above information D2 indicating the completion of the startup in the slave node 10-2, the OSC unit 17-2 sends to the slave node 10-3 the information D2 on the completion of the startup as an OSC signal OSC2.

[Operation 3] In the slave node 10-3, the operations for the thru-light-shutoff control as explained with reference to FIGS. 6 and 7 are performed. When the startup of the optical preamplifier 11-3 is completed, the NEM 14-3 sends to the OSC unit 17-3 information D3 on the completion of the startup.

In addition, when the OSC unit 17-3 receives the OSC signal OSC2 from the slave node 10-2 and the above information D3 indicating the completion of the startup in the slave node 10-3, the OSC unit 17-3 sends to the slave node 10-4 the information D3 on the completion of the startup as an OSC signal OSC3.

[Operation 4] In the slave node 10-4, the operations for the thru-light-shutoff control as explained with reference to FIGS. 6 and 7 are performed. When the startup of the optical preamplifier 11-4 is completed, the NEM 14-4 sends to the OSC unit 17-4 information D4 on the completion of the startup.

In addition, when the OSC unit 17-4 receives the OSC signal OSC3 from the slave node 10-3 and the above information D4 indicating the completion of the startup in the slave node 10-4, the OSC unit 17-4 sends to the master node 10-1 the information D4 on the completion of the startup as an OSC signal OSC4.

[Operation 5] When the OSC unit 17-1 in the master node 10-1 receives the OSC signal OSC4, the NEM 14-1 recognizes that all of the optical preamplifiers 11-2 to 11-4 in the slave nodes 10-2 to 10-4 on the ring network have been started up. (Therefore, all of the optical postamplifiers 12-2 to 12-4 have been started up.)

When the operational mode of the optical preamplifier 11-1 is changed to the AGC mode, the NEM 14-1 clears the thru-light-shutoff control of the optical switch unit 13-1, and stops the transmission of the OSC signal OSC1.

As explained above, until the optical amplifiers in the slave nodes 10-2 to 10-4 are started up, the thru light from the optical preamplifier 11-1 is shut off in the master node 10-1, and therefore the ring network temporarily becomes an open ring. Thus, it is possible to prevent oscillation at the time of startup of the ring network with higher reliability.

Incidentally, the operations for the thru-light-shutoff control in the above Operations 2 to 4 are performed independently in the respective slave nodes 10-2 to 10-4.

Although the operations for the thru-light-shutoff control are performed in the system of FIG. 10 in the case explained above, alternatively, it is possible to perform the operations for controlling the settings of the amounts of attenuation.

In the case explained below, the optical preamplifier 11 generates a random number, and settings are made so that startup timing is different in every node. For example, a function of generating a random number is implemented as firmware in the optical preamplifier 11 so that the startup timing of the optical preamplifier 11 in each node (e.g., after concurrent short breaks in the ring network or in a power-on operation of each node) becomes different.

Thus, even when the optical preamplifiers 11 in the ring network are concurrently powered on, the startup operations of the respective optical preamplifiers 11 are commenced at different timings since the startup timings based on random numbers are different.

When the above function is added to each node, it is possible to prevent oscillation at the time of startup of the ring network with still higher reliability. In addition, when serial numbers of the optical preamplifiers 11 are used as conditions for the generation of the random numbers, the random number generated in each node becomes unique in the network.

As explained above, according to the present invention, unstable optical signals are not emitted at the time of startup of the optical preamplifier in each node constituting the ring network. Therefore, it is possible to prevent the oscillation, and perform high-quality startup operations. In addition, since each node can be started up independently, the total time for starting up all of the nodes in the ring network can be reduced. That is, the service can be quickly started. Further, even in the case where a new node is added, a service at a wavelength which is provided in nodes other than the nodes adjacent to the added node is not adversely affected.

Although the present invention is applied to a ring network in the cases explained above, the present invention can also be applied to a network having a point-to-point or linear configuration.

As explained above, in the optical transmission system according to the present invention, when each optical preamplifier operates in the ALC mode, the thru light is shut off in the optical switch unit so that transmission of an optical signal having an unstable level to the next stage is stopped. When the operational mode of the optical preamplifier is changed to the AGC mode, the thru-light-shutoff control of the optical switch unit is cleared. Therefore, it is possible to prevent transmission of an optical signal having an unstable level through the respective nodes at the time of WDM initial setting. Thus, the efficiency in system operation and the transmission quality can be increased.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission system for performing WDM optical transmission, comprising:
   a plurality of nodes; and
   an optical transmission medium making connections between the plurality of nodes;
   wherein each of the plurality of nodes includes,
      an optical preamplifier which has an optical output, a gain, an operational mode, an ALC function for maintaining a level of the optical output constant, and an AGC function for maintaining the gain constant, where the operational mode of the optical preamplifier is changed from an ALC mode to an AGC mode after the gain is set in the ALC mode,
      an optical postamplifier which has an AGC function,
      an optical switch unit which performs an optical cross-connect operation, and
      a thru-light-shutoff control unit which makes a switch setting so as to shut off pass-through light in the optical switch unit and stop transmission of an optical signal having an unstable level to a next stage when the optical preamplifier operates in the ALC mode, and clears the switch setting when the operational mode of the optical preamplifier is changed to the AGC mode.

2. The optical transmission system according to claim 1, wherein the optical preamplifier in each of the plurality of nodes generates a random number, and is started up at a different timing.

3. An optical transmission apparatus for performing WDM optical transmission, comprising:
   an optical preamplifier which has an optical output, a gain, an operational mode, an ALC function for maintaining a level of the optical output constant, and an AGC function for maintaining the gain constant, where the operational mode of the optical preamplifier is changed from an ALC mode to an AGC mode after the gain is set in the ALC mode;
   an optical postamplifier which has an AGC function;
   an optical switch unit which performs an optical cross-connect operation; and
   a thru-light-shutoff control unit which makes a switch setting so as to shut off pass-through light in the optical switch unit and stop transmission of an optical signal having an unstable level to a next stage when the optical preamplifier operates in the ALC mode, and clears the switch setting when the operational mode of the optical preamplifier is changed to the AGC mode.

4. An optical transmission system for performing WDM optical transmission, comprising:
   a plurality of nodes; and
   an optical transmission medium making connections between the plurality of nodes;
   wherein each of the plurality of nodes includes,
      an optical preamplifier which has an optical output, a gain, an operational mode, an ALC function for maintaining a level of the optical output constant, and an AGC function for maintaining the gain constant, where the operational mode of the optical preamplifier is changed from an ALC mode to an AGC mode after the gain is set in the ALC mode,
      an optical postamplifier which has an AGC function,
      an optical switch unit which performs an optical cross-connect operation,
      a plurality of variable optical attenuators respectively provided for a plurality of wavelengths of optical signals, and
      an amount-of-attenuation control unit which sets an amount of attenuation in each of at least one of the plurality of variable optical attenuators corresponding to at least one optical signal having an unstable level to maximum so as to stop transmission of the at least one optical signal to a next stage when the optical preamplifier operates in the ALC mode, and releases each of the at least one of the plurality of variable optical attenuators from the setting of the amount of attenuation to the maximum when the operational mode of the optical preamplifier is changed to the AGC mode.

5. The optical transmission system according to claim 4, wherein the optical preamplifier in each of the plurality of nodes generates a random number, and is started up at a different timing.

6. An optical transmission apparatus for performing WDM optical transmission, comprising:
   an optical preamplifier which has an optical output, a gain, an operational mode, an ALC function for maintaining a level of the optical output constant, and an AGC function for maintaining the gain constant, where the operational mode of the optical preamplifier is changed from an ALC mode to an AGC mode after the gain is set in the ALC mode;

an optical postamplifier which has an AGC function;

an optical switch unit which performs an optical crossconnect operation;

a plurality of variable optical attenuators respectively provided for a plurality of wavelengths of optical signals; and an amount-of-attenuation control unit which sets an amount of attenuation in each of at least one of the plurality of variable optical attenuators corresponding to at least one optical signal having an unstable level to maximum so as to stop transmission of the at least one optical signal to a next stage when the optical preamplifier operates in the ALC mode, and releases each of the at least one of the plurality of variable optical attenuators from the setting of the amount of attenuation to the maximum when the operational mode of the optical preamplifier is changed to the AGC mode.

7. An optical transmission system for performing WDM optical transmission, comprising:

a plurality of nodes; and an optical transmission medium making connections between the plurality of nodes;

wherein each of the plurality of nodes includes, an optical preamplifier which has an optical output, a gain, an operational mode, an ALC function for maintaining a level of the optical output constant, and an AGC function for maintaining the gain constant, where the operational mode of the optical preamplifier is changed from an ALC mode to an AGC mode after the gain is set in the ALC mode, an optical postamplifier which has an AGC function, an optical switch unit which performs an optical crossconnect operation, a plurality of variable optical attenuators respectively provided for a plurality of wavelengths of optical signals, and an optical signal control unit which performs at least one of a thru-light-shutoff control operation and an amount-of-attenuation control operation, where in the thru-light-shutoff control operation, the optical signal control unit makes a switch setting so as to shut off pass-through light in the optical switch unit and stop transmission of an optical signal having an unstable level to a next stage when the optical preamplifier operates in the ALC mode, and clears the switch setting when the operational mode of the optical preamplifier is changed to the AGC mode, and in the amount-of-attenuation control operation, the optical signal control unit sets an amount of attenuation in each of at least one of the plurality of variable optical attenuators corresponding to at least one optical signal having an unstable level to maximum so as to stop transmission of the at least one optical signal to a next stage when the optical preamplifier operates in the ALC mode, and releases each of the at least one of the plurality of variable optical attenuators from the setting of the amount of attenuation to the maximum when the operational mode of the optical preamplifier is changed to the AGC mode.

8. An optical transmission system for performing WDM optical transmission, comprising:

a master node;

a plurality of slave nodes; and an optical transmission medium making connections between the master node and the plurality of slave nodes;

wherein the master node includes, a first optical preamplifier which has an optical output, a first gain, an operational mode, an ALC function for maintaining a level of the optical output constant, and an AGC function for maintaining the first gain constant, where the operational mode of the first optical preamplifier is changed from an ALC mode to an AGC mode after the first gain is set in the ALC mode, a first optical postamplifier which has an AGC function, a first optical switch unit which performs an optical crossconnect operation, a master-side thru-light-shutoff control unit which makes a first switch setting so as to shut off pass-through light in the first optical switch unit and stop transmission of an optical signal having an unstable level to a next stage until the master node receives information indicating completion of a startup from a node in a stage preceding the master node, and clears the first switch setting when the operational mode of the first optical preamplifier is changed to the AGC mode and the master node receives the information indicating completion of a startup from the node in the stage preceding the master node, and a false-startup-completion-information transmission unit which transmits false information falsely indicating completion of a startup to a node in a stage following the master node before the master node receives the information indicating completion of a startup from the node in the stage preceding the master node;

each of the plurality of slave nodes includes, a second optical preamplifier which has an optical output, a second gain, an operational mode, an ALC function for maintaining a level of the optical output constant, and an AGC function for maintaining the second gain constant, where the operational mode of the second optical preamplifier is changed from an ALC mode to an AGC mode after the second gain is set in the ALC mode, a second optical postamplifier which has an AGC function, a second optical switch unit which performs an optical crossconnect operation, a slave-side thru-light-shutoff control unit which makes a second switch setting so as to shut off pass-through light in the second optical switch unit and stop transmission of an optical signal having an unstable level to a next stage when the second optical preamplifier operates in the ALC mode, and clears the second switch setting when the operational mode of the second optical preamplifier is changed to the AGC mode, and a startup-completion-information transmission unit which transmits information indicating completion of a startup to a node in a stage following said each of the plurality of slave nodes when said each of the plurality of slave nodes receives either information indicating completion of a startup or the false information falsely indicating completion of a startup, from a node in a stage preceding the each of the plurality of slave nodes, and the operational mode of the second optical preamplifier is changed to the AGC mode.

9. A master node for performing WDM optical transmission on a network, comprising:

an optical preamplifier which has an optical output, a gain, an operational mode, an ALC function for maintaining a level of the optical output constant, and an AGC function for maintaining the gain constant, where the operational mode of the optical preamplifier is changed from an ALC mode to an AGC mode after the gain is set in the ALC mode;

an optical postamplifier which has an AGC function;

an optical switch unit which performs an optical cross-connect operation;

a master-side thru-light-shutoff control unit which makes a switch setting so as to shut off pass-through light in the optical switch unit and stop transmission of an optical signal having an unstable level to a next stage until the master node receives information indicating completion of a startup from a node in a stage preceding the master node, and clears the switch setting when the operational mode of the optical preamplifier is changed to the AGC mode and the master node receives the information indicating completion of a startup from the node in the stage preceding the master node; and a false-startup-completion-information transmission unit which transmits false information falsely indicating completion of a startup to a node in a stage following the master node before the master node receives the information indicating completion of a startup from the node in the stage preceding the master node.

10. A slave node for performing WDM optical transmission on a network, comprising:

an optical preamplifier which has an optical output, a gain, an operational mode, an ALC function for maintaining a level of the optical output constant, and an AGC function for maintaining the gain constant, where the operational mode of the optical preamplifier is changed from an ALC mode to an AGC mode after the gain is set in the ALC mode;

an optical postamplifier which has an AGC function;

an optical switch unit which performs an optical cross-connect operation;

a slave-side thru-light-shutoff control unit which makes a switch setting so as to shut off pass-through light in the optical switch unit and stop transmission of an optical signal having an unstable level to a next stage when the optical preamplifier operates in the ALC mode, and clears the switch setting when the operational mode of the optical preamplifier is changed to the AGC mode; and a startup-completion-information transmission unit which transmits information indicating completion of a startup to a node in a stage following the slave node when the slave node receives either information indicating completion of falsely indicating completion of a startup, from a node in a stage preceding the slave node, and the operational mode of the optical preamplifier is changed to the AGC mode.

11. A method for starting up an optical amplifier provided in a node which performs WDM optical transmission, and includes an optical switch unit performing an optical cross-connect operation, and an optical preamplifier having an optical output, a gain, an operational mode, an ALC function for maintaining a level of the optical output constant, and an AGC function for maintaining the gain constant, where the operational mode of the optical preamplifier is changed from an ALC mode to an AGC mode after the gain is set in the ALC mode;

the method comprising the steps of:

(a) making a switch setting so as to shut off pass-through light in the optical switch unit and stop transmission of an optical signal having an unstable level to a next stage when the optical preamplifier operates in the ALC mode; and (b) clearing the switch setting when the operational mode of the optical preamplifier is changed to the AGC mode.

12. A method for starting up an optical amplifier provided in a node which performs WDM optical transmission, and includes at least one variable optical attenuator corresponding to at least one optical signal, and an optical preamplifier having an optical output, a gains an operational mode, an ALC function for maintaining a level of the optical output constant, and an AGC function for maintaining the gain constant, where the operational mode of the optical preamplifier is changed from an ALC mode to an AGC mode after the gain is set in the ALC mode;

the method comprising the steps of:

(a) setting an amount of attenuation in one of the at least one variable optical attenuator corresponding to an optical signal having an unstable level to maximum so as to stop transmission of the optical signal to a next stage when the optical preamplifier operates in the ALC mode; and (b) releasing the one of the at least one variable optical attenuator from the setting of the amount of attenuation to the maximum when the operational mode of the optical preamplifier is changed to the AGC mode.

13. A method for starting up an optical amplifier provided in each of a master node and at least one slave node constituting a WDM network, where each of the master node and the at least one slave node includes an optical switch unit performing an optical crossconnect operation, and an optical preamplifier having an optical output, a gain, an operational mode, an ALC function for maintaining a level of the optical output constant, and an AGC function for maintaining the gain constant, and the operational mode of the optical preamplifier is changed from an ALC mode to an AGC mode after the gain is set in the ALC mode;

the method comprising the steps of:

(a) making a first switch setting so as to shut off pass-through light in the optical switch unit in the master node and stop transmission of an optical signal having an unstable level to a following stage until the master node receives information indicating completion of a startup from a slave node in a stage preceding the master node;

(b) clearing the first switch setting in the optical switch unit in the master node when the operational mode of the optical preamplifier in the master node is changed to the AGC mode and the master node receives the information indicating completion of a startup from the slave node in the stage preceding the master node;

(c) transmitting false information falsely indicating completion of a startup to a node in a stage following the master node before the master node receives the information indicating completion of a startup from the slave node in the stage preceding the master node;

(d) making a second switch setting so as to shut off pass-through light in the optical switch unit in one of the at least one slave node and stop transmission of an optical signal having an unstable level to a next stage when the optical preamplifier in the one of the at least one slave node operates in the ALC mode;

(e) clearing the second switch setting in the optical switch unit in the one of the at least one slave node when the operational mode of the optical preamplifier in the one of the at least one slave node is changed to the AGC mode; and (f) transmitting information indicating completion of a startup to a node in a stage following the one of the at least one slave node when the one of the at least one slave node receives either information indicating completion of a startup or the false information falsely indicating completion of a startup, from a node in a stage preceding the one of the at least one slave node, and the operational mode of the optical preamplifier in the one of the at least one slave node is changed to the AGC mode.

* * * * *

UNITED STATES PATENT AND TRADEMARK OFFICE
CERTIFICATE OF CORRECTION

PATENT NO. : 7,065,297 B2 Page 1 of 1
APPLICATION NO. : 10/365427
DATED : June 20, 2006
INVENTOR(S) : Kazunori Horachi et al.

It is certified that error appears in the above-identified patent and that said Letters Patent is hereby corrected as shown below:

Column 15, line 50, before "falsely" insert --a startup or false information--.
Column 16, line 10, change "gain" to --gains--.

Signed and Sealed this

Nineteenth Day of September, 2006

JON W. DUDAS
*Director of the United States Patent and Trademark Office*